(12) United States Patent
Mefford et al.

(10) Patent No.: US 10,200,128 B1
(45) Date of Patent: Feb. 5, 2019

(54) RF GENERATION USING TUNABLE OPTICAL SOURCE

(71) Applicant: The Boeing Company, Chicago, IL (US)

(72) Inventors: David Keith Mefford, Huntsville, AL (US); Robert Alan Smith, Owens Crossroads, AL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/807,683

(22) Filed: Nov. 9, 2017

(51) Int. Cl.
*H04B 10/00* (2013.01)
*H04B 10/50* (2013.01)
*G01J 1/44* (2006.01)
*G01J 9/00* (2006.01)
*G01J 1/42* (2006.01)
*G01J 1/04* (2006.01)

(52) U.S. Cl.
CPC ............ *H04B 10/50* (2013.01); *G01J 1/4257* (2013.01); *G01J 1/44* (2013.01); *G01J 9/00* (2013.01); *G01J 1/0433* (2013.01); *G01J 2001/448* (2013.01)

(58) Field of Classification Search
CPC .......... H04B 10/2575; H04B 10/25753; H04B 10/25752; H04B 10/25759; H04B 10/2507; H04B 10/58; H04B 10/25137; H04B 10/548

USPC ....... 398/115, 116, 182, 183, 188, 200, 201, 398/192, 193, 194, 158, 159
See application file for complete search history.

(56) References Cited

U.S. PATENT DOCUMENTS

2003/0202801 A1* 10/2003 Izadpanah ............ H01Q 3/2676
 398/200
2013/0051807 A1* 2/2013 Huang ............. H04B 10/25754
 398/116

* cited by examiner

*Primary Examiner* — Hanh Phan
(74) *Attorney, Agent, or Firm* — Vivacqua Law

(57) ABSTRACT

Systems and methods for generating radio frequency signals and/or microwave signals using a tunable optical source. An optical frequency comb including multiple optical components is received or generated based on an optical signal. A subset of optical components is selected from the multiple optical components. A detector array having two or more square law detectors is uniformly illuminated with the subset of optical components. Each square law detector of the detector array outputs an electrical signal having a difference frequency corresponding to a difference in frequency between the subset of optical components. A radio frequency or microwave output signal with a narrow bandwidth centered at a target frequency is generated by coherently summing each of the output signals output by the square law detectors.

20 Claims, 4 Drawing Sheets

RF GENERATION USING TUNABLE OPTICAL SOURCE

TECHNICAL FIELD

This disclosure relates to systems for generating radio frequency signals and/or microwave signals and, more particularly, to systems for generating radio frequency signals and/or microwave signals using a tunable optical source, and methods of making and using such systems.

BACKGROUND

Conventional techniques for generating radio frequency and/or microwave signals typically involve up-converting signals received from multiple signal sources to obtain such signals. However, noise and error may be introduced every time the signals are up-converted and by each signal source used. Also, the circuitry and various signal sources involved in implementing such techniques are relatively large, particularly for high power applications. Moreover, the signal sources that such techniques typically use, such as microwave clocks, are generally difficult to stabilize in the frequency and time domains. As such, it is often difficult to produce a high power, stable source of radio frequency/microwave signals using conventional techniques.

SUMMARY

This disclosure is directed to a system and method for generating radio frequency signals and/or microwave signals using a tunable optical source with low size, weight, and power constraints. The generated radio frequency signals and/or microwave signals are widely tunable with low phase noise and high signal-to-noise ratios. In one embodiment, a method includes generating an optical frequency comb comprising a plurality of optical components based on an optical signal, each adjacent optical component among the plurality of optical components separated by a repetition frequency in a frequency domain; selecting a subset of optical components from the plurality of optical components with a tunable filter assembly, the subset of optical components including a first optical component centered at a first comb frequency and a second optical component centered at a second comb frequency; illuminating a detector array with the subset of optical components, the detector array comprising a plurality of square law detectors that each output an electrical signal having a difference frequency associated with a difference in frequency between the first comb frequency and the second comb frequency; and generating an output signal with a narrow bandwidth centered at a target frequency by coherently summing each of the electrical signals output by the plurality of square law detectors.

In another embodiment, an apparatus includes a comb generator including a non-linear device configured to generate an optical frequency comb comprising a plurality of optical components based on an optical signal, each adjacent optical component among the plurality of optical components separated by a repetition frequency in a frequency domain; a tunable filter assembly, in optical communication with the comb generator, that is configured to select a subset of optical components from the plurality of optical components, the subset of optical components including a first optical component centered at a first comb frequency and a second optical component centered at a second comb frequency; a detector array, in optical communication with the tunable filter assembly, that comprises a plurality of square law detectors, each square law detector of the plurality of square law detectors being configured to produce an electrical signal upon being illuminated by the subset of optical components, the electrical signal having a difference frequency associated with a difference in frequency between the first comb frequency and the second comb frequency; and a readout assembly, in electrical communication with the detector array, that is configured to generate an output signal with a narrow bandwidth centered at a target frequency by coherently summing each of the electrical signals output by the plurality of square law detectors.

In yet another embodiment, a method includes receiving an optical frequency comb comprising a plurality of optical components based on an optical signal, each adjacent optical component among the plurality of optical components separated by a repetition frequency in a frequency domain; selecting a subset of optical components from the plurality of optical components with a tunable filter assembly, the subset of optical components including a first optical component centered at a first comb frequency and a second optical component centered at a second comb frequency; illuminating a detector array with the subset of optical components, the detector array comprising a plurality of square law detectors that each output an electrical signal having a difference frequency associated with a difference in frequency between the first comb frequency and the second comb frequency; and generating an output signal with a narrow bandwidth centered at a target frequency by coherently summing each of the electrical signals output by the plurality of square law detectors.

Other objects and advantages of the disclosed system for generating radio frequency signals and/or microwave signals using a tunable optical source and the method of making and using it will be apparent from the following description, the accompanying drawings, and the appended claims.

BRIEF DESCRIPTION OF THE DRAWINGS

The accompanying drawings, which are incorporated in and constitute a part of this specification, illustrate various embodiments of the present invention and, together with the general description of the invention given above, and the detailed description of the embodiments given below, serve to explain the embodiments of the invention. In the drawings, like reference numerals are used to indicate like parts in the various views.

DETAILED DESCRIPTION

Figure 1:
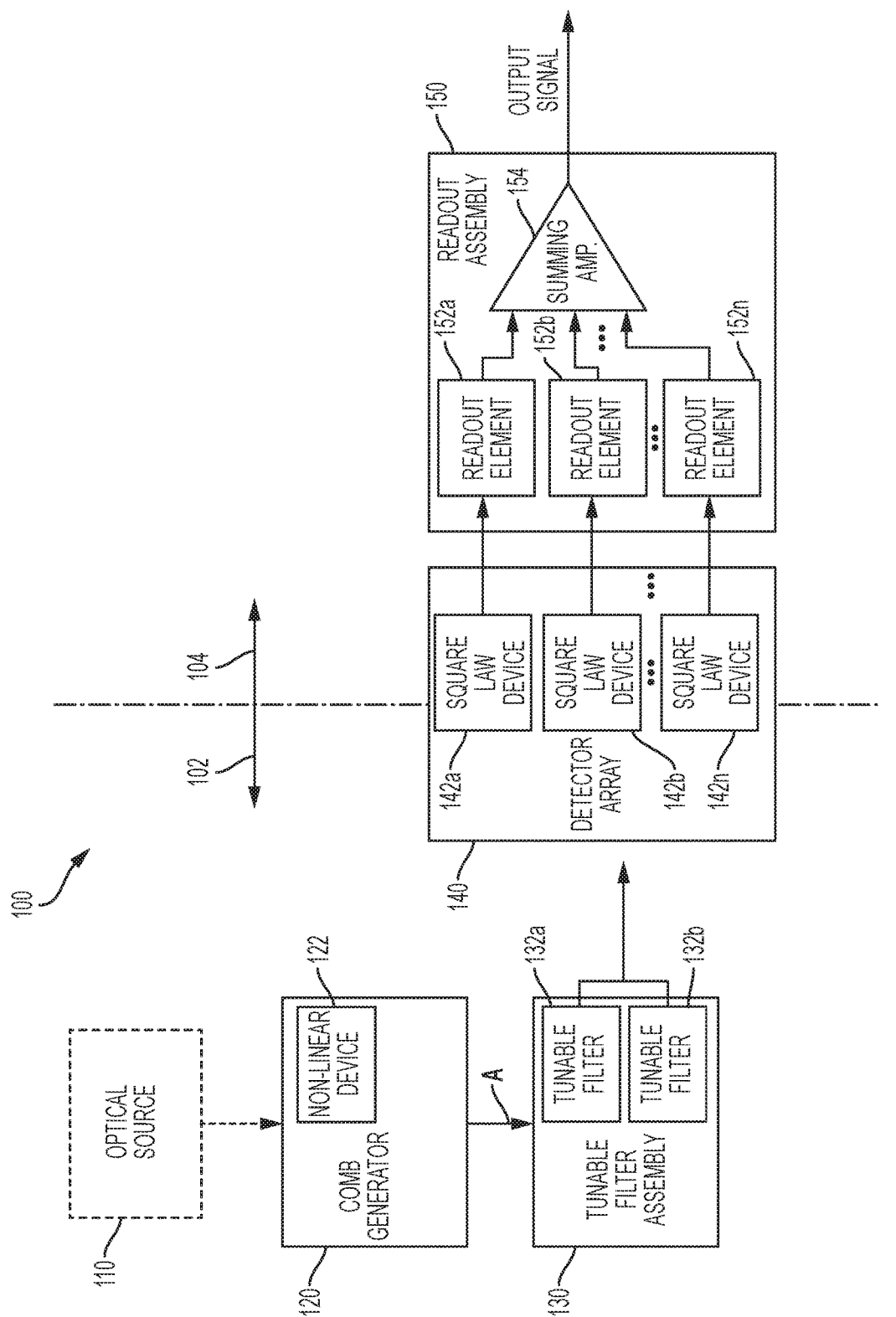
FIG. 1 is a block diagram of an example system for generating radio frequency and/or microwave signals using a tunable optical source that is suitable for implementing aspects of the present invention.

As shown in FIG. 1, a system for generating radio frequency and/or microwave signals using a tunable optical source, generally designated 100, includes an optical domain 102 in which optical signals are propagated and an electrical domain 104 in which electrical signals are propagated. Optical domain 102 includes a comb generator 120 and a tunable filter assembly 130. Comb generator 120 includes a non-linear device 122, such as a resonator or a solid-state resonator, that is configured to generate an optical frequency comb based on an optical signal. In an embodiment, the resonator or solid-state resonator exhibits a high resonance quality factor. In an embodiment, the resonator or solid-state resonator is configured to have a ring, a spherical, a toroidal, or an elliptical geometry. In an embodiment, the resonator or solid-state resonator is fabricated using glass, silica, silicon, compound semiconductors, crystalline material, or a combination thereof. In an embodiment, comb generator 120 further includes a stabilization circuit configured to stabilize aspects of comb generator 120 related to a carrier-envelope offset frequency of the optical frequency comb, a repetition frequency of the optical frequency comb, or a combination thereof.

In an embodiment, the optical signal is a narrow linewidth signal provided by a laser diode (i.e., a single laser diode) operating in a continuous-wave mode of operation. In an embodiment, system 100 further includes an optical source, such as a laser diode operating in a continuous-wave mode of operation, configured to generate the optical signal. In an embodiment, system 100 receives the optical signal from an external optical source. As described in greater detail below with respect to FIGS. 2A and 2B, the optical frequency comb is comprised of a plurality of optical components.

Optical domain 102 further includes a tunable filter assembly 130 that is in optical communication with comb generator 120. As such, any optical frequency combs generated by comb generator 120 may propagate to tunable filter assembly 130 via a waveguide, an optical fiber, free-space propagation, or a combination thereof. Tunable filter assembly 130 is configured to select a subset of optical components from the plurality of optical components. As an example, the subset of optical components may include a first optical component centered at a first comb frequency and a second optical component centered at a second comb frequency.

Tunable filter assembly 130 is composed of a plurality of tunable filters, such as tunable filter 132a and 132b (collectively referred to herein as "tunable filters 132"). Tunable filters 132 may each be implemented using a resonator, a solid-state resonator, an optical passband filter, or any known tunable optical filter. In an embodiment, the resonator or solid-state resonator exhibits a high resonance quality factor. In an embodiment, the resonator or solid-state resonator is configured to have a ring, a spherical, a toroidal, or an elliptical geometry. In an embodiment, the resonator or solid-state resonator is fabricated using glass, silica, silicon, compound semiconductors, crystalline material, or a combination thereof.

Each tunable filter among the plurality of tunable filters 132 may be configured to select a particular optical component from the plurality of optical components. Continuing with the example above, tunable filter 132a may have a passband centered at the first comb frequency associated with the first optical component whereas tunable filter 132b may have a pass band centered at the second comb frequency associated with the second optical component.

Straddling between optical domain 102 and electrical domain 104 is a detector array 140. Detector array 140 is in optical communication with tunable filter assembly 130. Consequently, the subset of optical components selected by tunable filter assembly 130 may propagate to detector array 140 via a waveguide, an optical fiber, free-space propagation, or a combination thereof. Upon propagating from tunable filter assembly 130, the selected subset of optical components uniformly illuminate detector array 140.

Detector array 140 includes a plurality of square law detectors, such as square law detectors 142a and 142b through 142n (collectively referred to herein as "square law detectors 142"). Examples of suitable components for implementing square law detectors 142 include: p-n junction photodiodes, PIN junction photodiodes, avalanche photodiodes, photoconductors, charge-coupled sensors, complementary metal-oxide semiconductor sensors, charge injection sensors, photo-transistors, and the like. In operation, the selected subset of optical components are received by each square law detector 142 as an input of incident optical energy having comb frequencies associated with each optical component of the selected subset of optical components. Each square law detector 142 converts that incident optical energy into electrical energy to produce an electrical signal containing frequency components equal to the various sums and differences of the comb frequencies associated with each optical component. In an embodiment, a filter associated with detector array 140 is configured to pass a subset of those various sum and difference frequencies.

By way of example, each square law detector may receive a selected subset of optical signals consisting of the first optical component and the second optical component discussed above as an input of incident optical energy. In this example, that incident optical energy would include the first comb frequency associated with the first optical component and the second comb frequency associated with the second optical element. An electrical signal output by each square law detector following conversion of that incident optical energy would include frequency components equal to a difference frequency and a sum frequency. The difference frequency would be associated with a difference in frequency between the first comb frequency and the second comb frequency and the sum frequency would be associated with a sum of the first comb frequency and the second comb frequency. In this example, a filter associated with detector array 140 may be configured to only pass the frequency component equal to the difference frequency.

Electrical domain 104 further includes a readout assembly 150 that is in electrical communication with detector assembly 140. As such, any electrical signals produced by the square law detectors 142 of detector assembly 140 may propagate to readout assembly 150 via a wire, a bus line, an electrical trace, a via, or any known electrically conductive material. Readout assembly 150 is configured to generate an output signal with a narrow bandwidth centered at a target frequency by coherently summing each electrical signal output by square law detectors 142. Readout assembly 150 includes a plurality of readout elements, such as readout elements 152a and 152b through 152n (collectively referred to herein as "readout elements 152"). Examples of suitable components for implementing readout elements 152 include: transistors, diodes, diode switches, charge-coupled devices, bi-polar transistors, field effect transistors, and the like. In an embodiment, the number of readout elements in readout assembly 150 equals the number of square law detectors in detector array 140. In an embodiment, readout assembly 150 is effectuated using a readout integrated circuit.

Readout assembly 150 further includes summing amplifier 154 that is configured to generate an output signal with a narrow bandwidth centered at a target frequency by coherently summing each of the outputs of readout elements 152a and 152b through 152n. As known by those skilled in the art, noise is incoherent. Therefore, coherently summing (or adding) each of the electrical signals output by the square law detectors reduces any such incoherent noise present in those electrical signals. Consequently, an output signal generated by a system implemented in accordance with aspects of the present invention generally has lower noise floor than output signals generated by known systems. That is, by processing selected optical components in parallel to generate electrical signals and coherently summing those electrical signals to generate an output signal, a signal-to-noise ratio of the output signal is increased. In an embodiment, the signal-to-noise ratio of the output signal is increased by a factor of IN, where N is the number of square law detectors 142 included in detector array 140.

In an embodiment, the target frequency of the output signal may be adjusted by tuning a resonator or a solid-state resonator of a comb generator that generates the optical frequency comb, modifying a pulse-to-pulse change in a carrier-envelope phase of the optical frequency comb, or a combination thereof. For example, the resonator or solid-state resonator may be tuned using stabilization electronics associated with the comb generator. As another example, the resonator or solid-state resonator may be tuned by varying a physical characteristic of the resonator or solid-state resonator, such as a circumference.

In an embodiment, the output signal is provided to a communication device, a radar device, or a combination thereof for further processing. For example, the output signal may be provided to a communication device for use as a carrier signal by modulating the output signal with an information signal (e.g., voice, audio, data, etc.). In an embodiment, a second output signal centered at a second target frequency that is lower than the target frequency may be generated by down-converting the output signal.

Figure 2A:
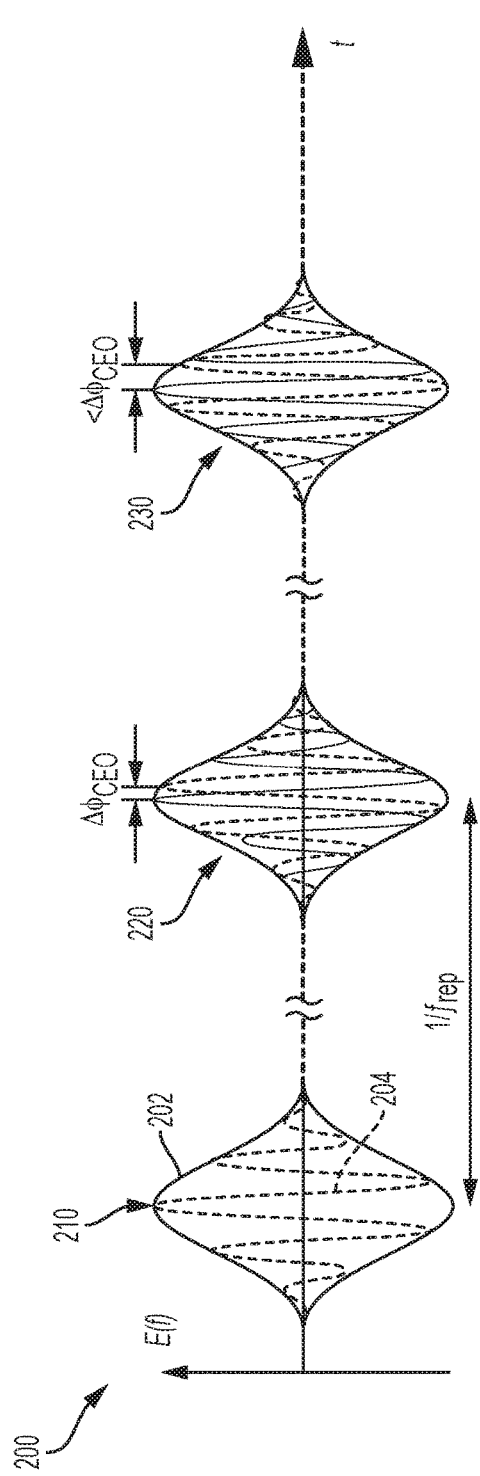
FIGS. 2A and 2B are graphs illustrating an optical frequency comb in a time domain and a frequency domain, respectively, that is suitable for implementing aspects of the present invention.
Figure 2B:
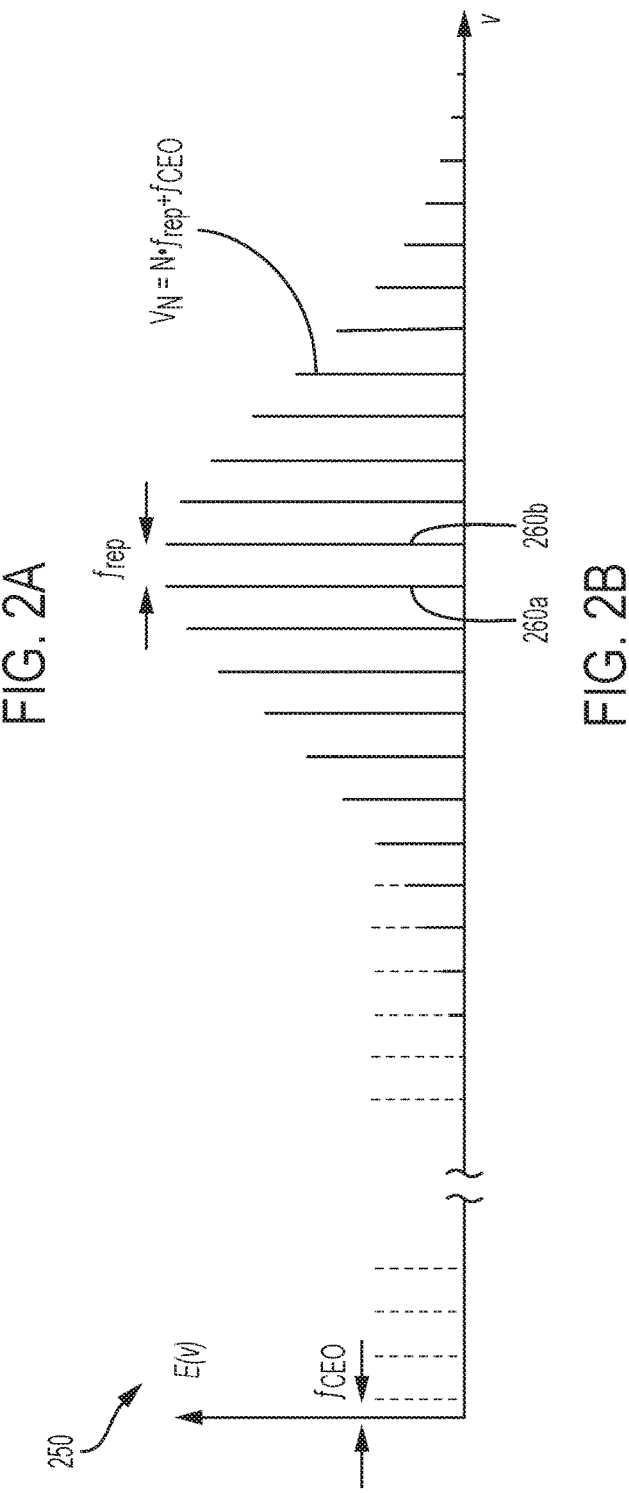

FIGS. 2A and 2B are graphs illustrating an optical frequency comb in a time domain and a frequency domain, respectively. The optical frequency comb illustrated in FIGS. 2A and 2B is an embodiment of an optical frequency comb generated by comb generator 110 at point "A" in FIG. 1. One skilled in the art will recognize that the optical frequency comb of FIGS. 2A and 2B represents a theoretical result achieved under ideal conditions, and thus slight variations may exist in practice.

As shown in FIG. 2A, the time domain spectrum 200 of the optical frequency comb includes a sequence of optical pulses. In the embodiment of FIG. 2A, three optical pulses (210, 220, and 230) of the sequence of optical pulses are shown. Each optical pulse of that sequence of optical pulses corresponds to an electric field that is defined by the product of a wave envelope 202 and a carrier wave 204. Wave envelope 202 propagates at a group velocity that corresponds to a propagation speed of the energy. Carrier wave 204 is represented by a sinusoidal oscillation in an optical frequency range that propagates at a phase velocity. A time-dependent amplitude of the electric field is defined by:

Equation 1

$$E(t) = A(t)\cos(\omega_c t + \phi_{CE}) \quad (1)$$

Where:

$A(t)$ = amplitude of the wave envelope at the "$t$"

$\omega_c$ = frequency of the carrier wave $\phi_{CE}$ = carrier-envelope phase

As optical pulses of the optical frequency comb propagate through a medium, a relative position between wave envelope 202 and carrier wave 204 will typically change due to such factors as chromatic dispersion and optical nonlinearities. That relative position change causing a difference between the group velocity of wave envelope 202 and the phase velocity of carrier wave 204. The difference between a peak value of wave envelope 202 and a peak value of carrier wave 204 is defined as the carrier-envelope phase ($\phi_{CE}$). The carrier-envelope phase may be partitioned into two constituent parts defined by:

Equation 2

$$\phi_{CE} = \phi_o + \Delta\phi_{CE} \quad (2)$$

Where:

$\phi_o$ = absolute phase (or static) offset $\Delta\phi_{CE}$ = pulse-to-pulse change in the carrier-envelope phase The first constituent part ($\phi_o$) of the carrier-envelope phase corresponds to changes to the carrier-envelope phase introduced by conditions external to an optical source (e.g., comb generator 120 of FIG. 1). The second constituent part ($\Delta\phi_{CE}$) of the carrier-envelope phase corresponds to changes to the carrier-envelope phase introduced by conditions internal to the optical source.

Turning to FIG. 2B, a frequency domain spectrum 250 of the optical frequency comb includes a plurality of optical components (e.g., optical components 260a and 260b). Each optical component of the plurality of optical components in the frequency domain spectrum 250 is separated from adjacent optical components by a repetition frequency ($f_{rep}$). As seen in FIG. 2A, an inversely proportional relationship exists between the repetition frequency separating adjacent optical components in the frequency domain spectrum 250 and the periodicity of optical pulses in the time domain spectrum 200. Returning to FIG. 2B, the offset of the carrier-envelope discussed above with respect to time domain spectrum 200 is related to an offset of the optical frequency comb on the frequency axis. That offset of the optical frequency comb on the frequency axis is referred to as the carrier-envelope offset frequency ($f_{CEO}$). Using the repetition frequency and the carrier-envelope offset frequency, the frequency domain spectrum 250 of the optical frequency comb may be defined by:

Equation 3

$$v_N = Nf_{rep} f_{CEO} \quad (3)$$

Figure 3B:
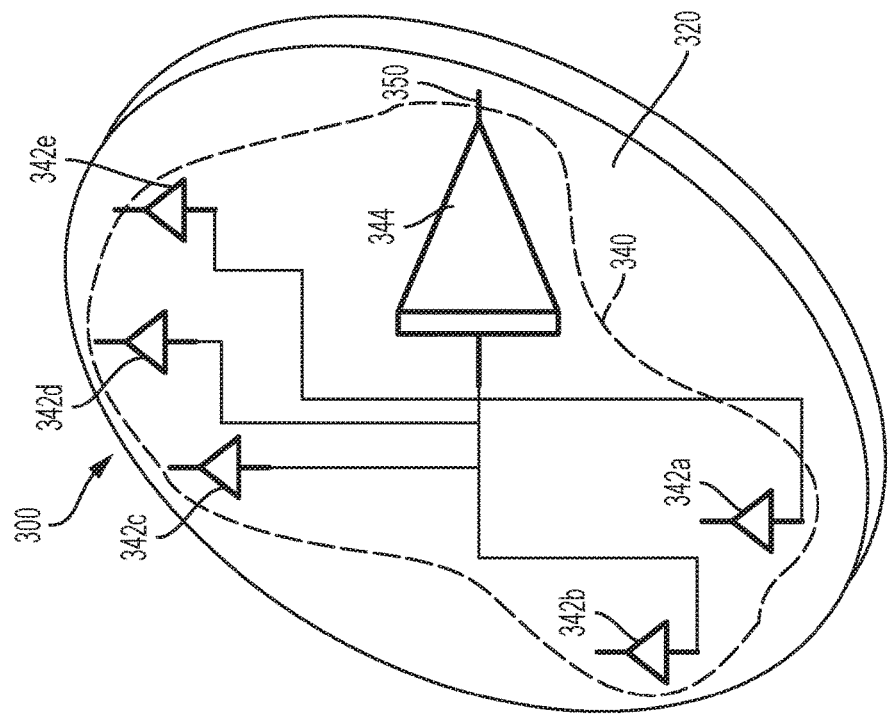
FIGS. 3A and 3B depict a detector array and a readout assembly, respectively, fabricated on opposing planes of a substrate in accordance with aspects of the present invention.
Figure 3A:
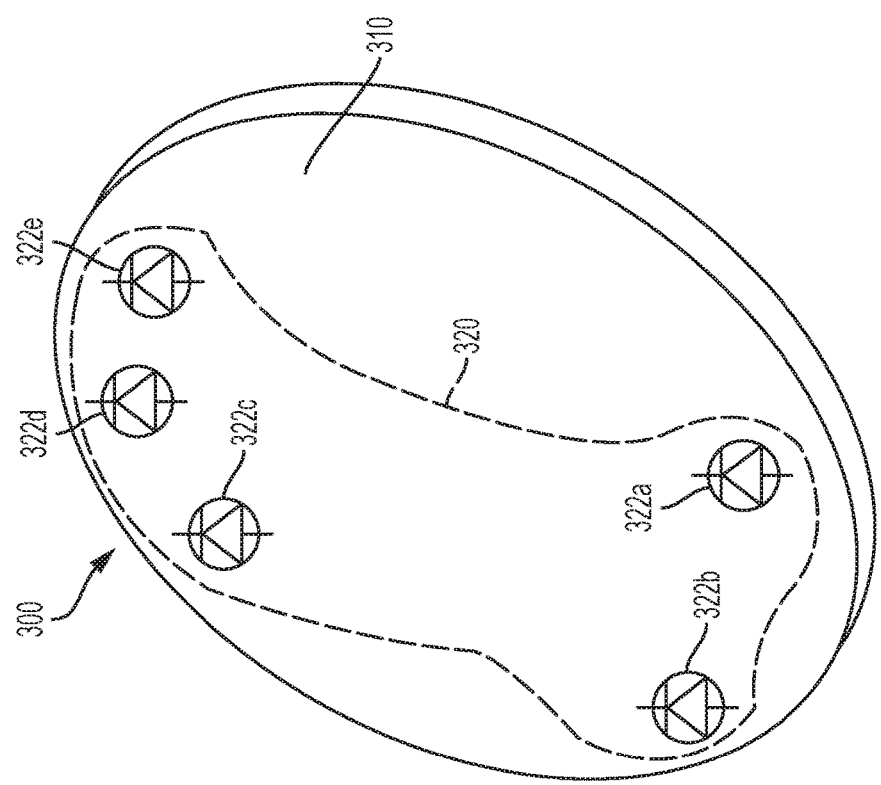

Where:

$v_N$ = a comb frequency of an $n$-th optical component $N$ = an integer value $f_{rep}$ = repetition frequency $f_{CEO}$ = carrier-envelope offset frequency As shown by FIGS. 3A and 3B, a detector array 320 and a readout assembly 340 may each be implemented with circuits having a footprints that facilitate chip-scaled packaging. In the embodiment depicted by FIGS. 3A and 3B, detector array 320 and readout assembly 340 have been fabricated on opposing planes of a substrate 300. However, in other embodiments, detector array 320 and readout assembly 340 may be fabricated on different substrates. In accordance with this embodiment, FIG. 3A shows detector array 320 as being fabricated on a first plane 310 of substrate 300 and FIG. 3B shows readout assembly 340 as being fabricated on a second plane 330 of substrate 300 opposing first plane 310.

An output of each square law detector included in detector array 320 may be electrically coupled to an input of a corresponding readout element in readout assembly 340 using any known means. For example, an output of square law detector 322a may be electrically coupled to an input of readout element 342a using a via or electrical trace (not shown) introduced into substrate 300. The outputs of square law detectors 322b, 322c, 322d, and 322e may likewise be electrically coupled to the inputs of readout elements 342b, 342c, 342d, and 342e, respectively. A summing amplifier 344 of readout assembly 340 could generate an output signal with a narrow bandwidth centered at a target frequency at output 350 by coherently summing each of the outputs of readout elements 342a-342e.

In an embodiment, a tunable filter assembly, a comb generator, an optical source, or a combination thereof are also fabricated on substrate 300. Thus, in accordance to aspects of the present invention, the chip-scaled detector array 320 and readout assembly 340 may be combined with other components to implement a tunable source of radio frequency (or microwave) signals in a chip-scale package.

Figures 4, 5:
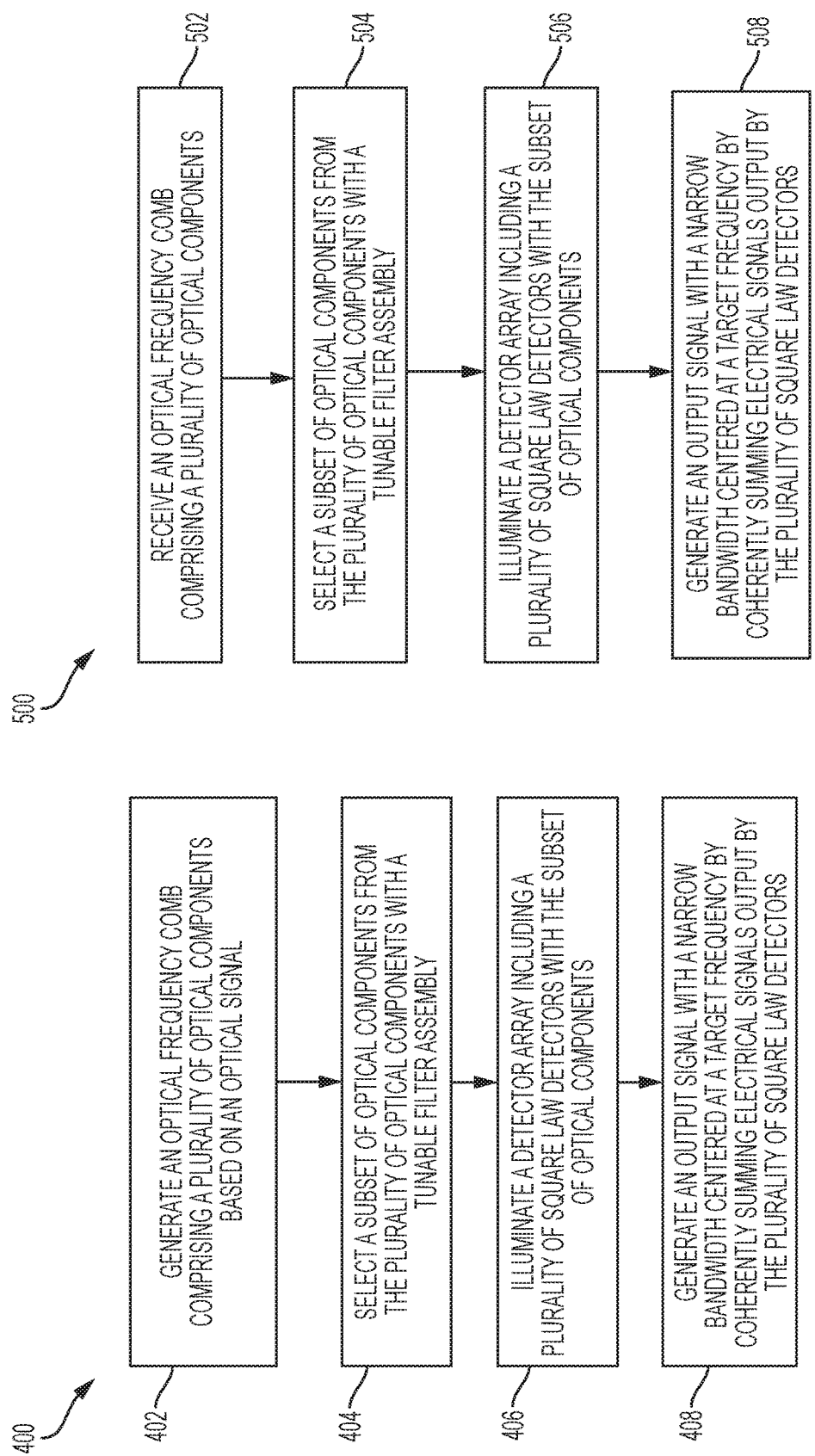
FIG. 4 is a flow-chart illustrating an example of a method for generating radio frequency and/or microwave signals using a tunable optical source.
FIG. 5 is a flow-chart illustrating another example of a method for generating radio frequency and/or microwave signals using a tunable optical source.

FIG. 4 depicts an embodiment of a method 400 for generating radio frequency and/or microwave signals using a tunable optical source. In an embodiment, method 400 may be effectuated by system 100 of FIG. 1. At block 402, an optical frequency comb comprising a plurality of optical components is generated based on an optical signal. Each optical component among the plurality of optical components is separated from adjacent optical components by a repetition frequency in a frequency domain. In an embodiment, block 402 may be effectuated by comb generator 120 of FIG. 1. In an embodiment, the optical signal is a narrow linewidth signal provided by a laser diode operating in a continuous-wave mode of operation. In an embodiment, the repetition frequency is 80 Gigahertz or higher.

At block 404, a subset of optical components is selected from the plurality of optical components. In an embodiment, the subset of optical components includes a first optical component centered at a first comb frequency and a second optical component centered at a second comb frequency that is different than the first comb frequency. In an embodiment, the subset of optical components includes three or more optical components that are each centered at a different comb frequency. In an embodiment, the subset of optical components are selected based on a target frequency of an output signal. In an embodiment, block 404 may be effectuated by tunable filter assembly 130 of FIG. 1. In an embodiment, a clock signal is locked to a third comb frequency associated with a third optical component of the optical frequency comb.

At block 406, a detector array is uniformly illuminated with the subset of optical components. The detector array including a plurality of square law detectors that each output an electrical signal having a difference frequency associated with a difference in frequency between the first comb frequency and the second comb frequency. In an embodiment, the detector array is implemented using detector array 140 of FIG. 1. At block 408, an output signal with a narrow bandwidth centered at a target frequency is generated by coherently summing each of the electrical signals output by the plurality of square law detectors. In an embodiment, the output signal is a radio frequency signal or a microwave signal. In an embodiment, block 408 is effectuated by readout assembly 150 of FIG. 1.

FIG. 5 depicts another embodiment of a method 500 for generating radio frequency and/or microwave signals using a tunable optical source. In an embodiment, method 400 may be effectuated by system 100 of FIG. 1. At block 502, an optical frequency comb comprising a plurality of optical components is received. Each optical component among the plurality of optical components is separated from adjacent optical components by a repetition frequency in a frequency domain. In an embodiment, the optical frequency comb is received from a chip-based source. In an embodiment, the repetition frequency is 80 Gigahertz or higher.

At block 504, a subset of optical components is selected from the plurality of optical components. In an embodiment, the subset of optical components includes a first optical component centered at a first comb frequency and a second optical component centered at a second comb frequency that is different than the first comb frequency. In an embodiment, the subset of optical components includes three or more optical components that are each centered at a different comb frequency. In an embodiment, the subset of optical components are selected based on a target frequency of an output signal. In an embodiment, block 504 may be effectuated by tunable filter assembly 130 of FIG. 1. In an embodiment, a clock signal is locked to a third comb frequency associated with a third optical component of the optical frequency comb.

At block 506, a detector array is uniformly illuminated with the subset of optical components. The detector array including a plurality of square law detectors that each output an electrical signal having a difference frequency associated with a difference in frequency between the first comb frequency and the second comb frequency. In an embodiment, the detector array is implemented using detector array 140 of FIG. 1. At block 508, an output signal with a narrow bandwidth centered at a target frequency is generated by coherently summing each of the electrical signals output by the plurality of square law detectors. In an embodiment, the output signal is a radio frequency signal or a microwave signal. In an embodiment, block 508 is effectuated by readout assembly 150 of FIG. 1.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method comprising:
   generating an optical frequency comb comprising a plurality of optical components based on an optical signal, each adjacent optical component among the plurality of optical components separated by a repetition frequency in a frequency domain;
   selecting a subset of optical components from the plurality of optical components with a tunable filter assembly, the subset of optical components including a first optical component centered at a first comb frequency and a second optical component centered at a second comb frequency;
   illuminating a detector array with the subset of optical components, the detector array comprising a plurality of square law detectors that each output an electrical signal having a difference frequency associated with a difference in frequency between the first comb frequency and the second comb frequency; and
   generating an output signal with a narrow bandwidth centered at a target frequency by coherently summing each of the electrical signals output by the plurality of square law detectors.

2. The method of claim 1, wherein the output signal is a radio frequency signal or a microwave signal.

3. The method of claim 1, further comprising:
   locking a clock signal to a third comb frequency associated with a third optical component of the optical frequency comb.

4. The method of claim 1, wherein the optical signal is a narrow linewidth signal provided by a laser diode operating in a continuous-wave mode of operation.

5. The method of claim 1, wherein the subset of optical components are selected based on the target frequency.

6. The method of claim 1, wherein the tunable filter assembly includes a solid-state resonator.

7. The method of claim 1, further comprising:
   adjusting the target frequency of the output signal by tuning a solid-state resonator of a comb generator that generates the optical frequency comb, modifying a pulse-to-pulse change in a carrier-envelope phase of the optical frequency comb, or a combination thereof.

8. The method of claim 1, wherein the repetition frequency is 80 Gigahertz or higher.

9. An apparatus comprising:
   a comb generator including a non-linear device configured to generate an optical frequency comb comprising a plurality of optical components based on an optical signal, each adjacent optical component among the plurality of optical components separated by a repetition frequency in a frequency domain;
   a tunable filter assembly, in optical communication with the comb generator, that is configured to select a subset of optical components from the plurality of optical components, the subset of optical components including a first optical component centered at a first comb frequency and a second optical component centered at a second comb frequency;
   a detector array, in optical communication with the tunable filter assembly, that comprises a plurality of square law detectors, each square law detector of the plurality of square law detectors being configured to output an electrical signal upon being illuminated by the subset of optical components, the electrical signal having a difference frequency associated with a difference in frequency between the first comb frequency and the second comb frequency; and
   a readout assembly, in electrical communication with the detector array, that is configured to generate an output signal with a narrow bandwidth centered at a target frequency by coherently summing each of the electrical signals output by the plurality of square law detectors.

10. The apparatus of claim 9, wherein the detector array is fabricated on a first plane of a substrate and the readout assembly is fabricated on a second plane of the substrate opposing the first plane.

11. The apparatus of claim 9, further comprising:
    a laser diode operating in a continuous-wave mode of operation that is configured to provide the optical signal.

12. The apparatus of claim 9, wherein the non-linear device is a solid-state resonator.

13. The apparatus of claim 9, wherein the plurality of square law detectors include a photodiode, an avalanche photodiode, a PIN photodiode, or a combination thereof.

14. The apparatus of claim 9, wherein the tunable filter assembly, the detector array, and the readout assembly are fabricated on a substrate.

15. The apparatus of claim 14, wherein the comb generator is fabricated on the substrate.

16. A method comprising:
    generating an optical frequency comb comprising a plurality of optical components by a comb generator, wherein each adjacent optical component among the plurality of optical components is separated by a repetition frequency in a frequency domain;
    receiving, by a tunable filter assembly, the optical frequency comb comprising the plurality of optical components;
    selecting a subset of optical components from the plurality of optical components with the tunable filter assembly, the subset of optical components including a first optical component centered at a first comb frequency and a second optical component centered at a second comb frequency;
    illuminating a detector array with the subset of optical components, the detector array comprising a plurality of square law detectors that each output an electrical signal having a difference frequency associated with a difference in frequency between the first comb frequency and the second comb frequency; and
    generating an output signal with a narrow bandwidth centered at a target frequency by coherently summing each of the electrical signals output by the plurality of square law detectors.

17. The method of claim 16, wherein the optical frequency comb is received from a chip-based source.

18. The method of claim 16, further comprising:
    modulating the output signal with an information signal.

19. The method of claim 16, further comprising:
    providing the output signal to a communication device, a radar device, or a combination thereof.

20. The method of claim 16, further comprising:
generating a second output signal by down-converting the output signal.

\* \* \* \* \*